(12) United States Patent
Maranville et al.

(10) Patent No.: US 8,993,929 B2
(45) Date of Patent: Mar. 31, 2015

(54) HEATED/COOLED THERMOELECTRIC STEERING WHEEL

(75) Inventors: Clay Wesley Maranville, Ypsilanti, MI (US); John Robert Van Wiemeersch, Novi, MI (US); Jim Theodore Cikalo, Farmington Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 499 days.

(21) Appl. No.: 13/348,688

(22) Filed: Jan. 12, 2012

(65) Prior Publication Data

US 2013/0180354 A1    Jul. 18, 2013

(51) Int. Cl.
  *B60L 1/02*    (2006.01)
  *B60H 1/00*    (2006.01)
  B62D 1/04    (2006.01)
  B62D 1/06    (2006.01)

(52) U.S. Cl.
  CPC ............ *B60H 1/00292* (2013.01); *B62D 1/065* (2013.01)
  USPC ........................................................ 219/204

(58) Field of Classification Search
  CPC ................ B60H 1/00292; B60H 2001/003; B62D 1/065
  See application file for complete search history.

(56) References Cited

U.S. PATENT DOCUMENTS

| | | | |
|---|---|---|---|
| 4,640,340 A | 2/1987 | Noda et al. | |
| 5,850,741 A * | 12/1998 | Feher | 62/3.61 |
| 6,298,750 B1 | 10/2001 | Kerner et al. | |
| 6,533,184 B1 | 3/2003 | Kim | |
| 2005/0006369 A1* | 1/2005 | Kreuzer | 219/204 |
| 2007/0210050 A1* | 9/2007 | Choi | 219/204 |
| 2009/0000310 A1* | 1/2009 | Bell et al. | 62/3.7 |
| 2009/0007721 A1* | 1/2009 | Cortina et al. | 74/558 |
| 2011/0084055 A1* | 4/2011 | Park et al. | 219/204 |

FOREIGN PATENT DOCUMENTS

| | | |
|---|---|---|
| FR | 2682071 A1 | 4/1993 |
| JP | 2006176037 A | 7/2006 |
| JP | 2007153026 A | 6/2007 |
| KR | 20100041288 A | 4/2010 |
| WO | 03/047942 A1 | 6/2003 |
| WO | 2009009029 A1 | 1/2009 |

* cited by examiner

*Primary Examiner* — Shawntina Fuqua
(74) *Attorney, Agent, or Firm* — Vichit Chea; Price Heneveld LLP

(57) ABSTRACT

A steering wheel includes a central portion connected to the steering column for rotation about an axis, and a rim extending around the central portion. A steering wheel includes a passageway extending through portions of the steering wheel. A plurality of spaced apart rings are disposed on the rim, and a plurality of N-type and P-type thermoelectric ("TE") elements are disposed on the rings. The thermoelectric elements may comprise Peltier devices in the form of relatively thin plate-like units having generally planar opposite surfaces, and rectangular perimeters. An electrical conductor interconnects the P-type and N-type elements in series. The steering wheel includes first and second thermal conductors thermally connected to inner and outer surfaces of the thermoelectric elements. An air circulation device moves air through the passageway to cool the rim of the steering wheel.

24 Claims, 6 Drawing Sheets

US 8,993,929 B2

HEATED/COOLED THERMOELECTRIC STEERING WHEEL

FIELD OF THE INVENTION

The present invention generally relates to thermally-controlled steering wheels for vehicles, and more specifically to a heated and cooled steering wheel including a plurality of thermoelectric elements.

BACKGROUND OF THE INVENTION

Thermal comfort of vehicle occupants is an important aspect of the driving experience. Vehicle touch surfaces can get hot after being exposed to the sun. Existing steering wheels may reach temperatures that are well above the ambient temperature. Because the steering wheel may be exposed to more direct sun than other controls necessary for driving (e.g. ignition switch, shifter, brake, accelerator, seat cushions etc.), the steering wheel may be too hot to touch, thus preventing the driver from driving the vehicle until it has cooled. Traditional methods of cooling a vehicle interior space by air circulation involve opening a door or opening one or more windows. These known cooling methods require a user to be present for security reasons while waiting for the steering wheel to cool. Although it may be possible to remotely actuate a vehicle's air conditioning system in some instances, this is typically a very inefficient way to cool the steering wheel, and the steering wheel may still be too hot to touch for some time even if the cabin air temperature is comfortable. In view of the above, a need exists for an improved way to cool vehicle steering wheels.

Also, if a user begins to use a steering wheel after it has been exposed to cold temperatures, the user may experience discomfort upon contact with the cold wheel. Although heated steering wheels have been developed, known heated steering wheels may suffer from various drawbacks due to limits in the amount of heat available to heat the steering wheel.

SUMMARY OF THE INVENTION

One aspect of the present invention is a steering wheel assembly for motor vehicles of the type having a steering column. The steering wheel includes a central portion connected to the steering column for rotation about an axis, and a rim extending around the central portion. The steering wheel includes a passageway extending through at least a portion of the rim, the central portion of the steering wheel. The passageway may also extend through the steering column. The rim defines an outer side portion facing away from the axis. The steering wheel further includes a plurality of spaced apart rings of material disposed on the rim. A plurality of N-type thermoelectric ("TE") elements having inner and outer surfaces are disposed on at least one of the rings with the inner surface of the N-type TE element facing the rim. The steering wheel assembly further includes a plurality of P-type TE elements disposed on at least one of the rings with the inner surface of the TE element facing the rim. The N-type and P-type TE elements may be electrically connected to the rings upon which each of the thermoelectric elements is disposed. The N-type and P-type thermoelectric elements may comprise Peltier devices in the form of relatively thin plate-like units having generally planar opposite surfaces, and rectangular perimeters. An electrical conductor interconnects the P-type and N-type TE elements in series. The steering wheel assembly further includes a first thermal conductor thermally connected to the inner surfaces of the N-type and P-type TE elements, and a second thermal conductor that is thermally connected to the outer surfaces of the N-type and P-type TE elements, whereby the P and N type TE elements are thermally connected in parallel between the first and second thermal conductors. A powered air circulation device moves air through the passageway from the rim to the steering column to thereby cool the rim upon application of electrical power to the P-type and N-type elements.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1:
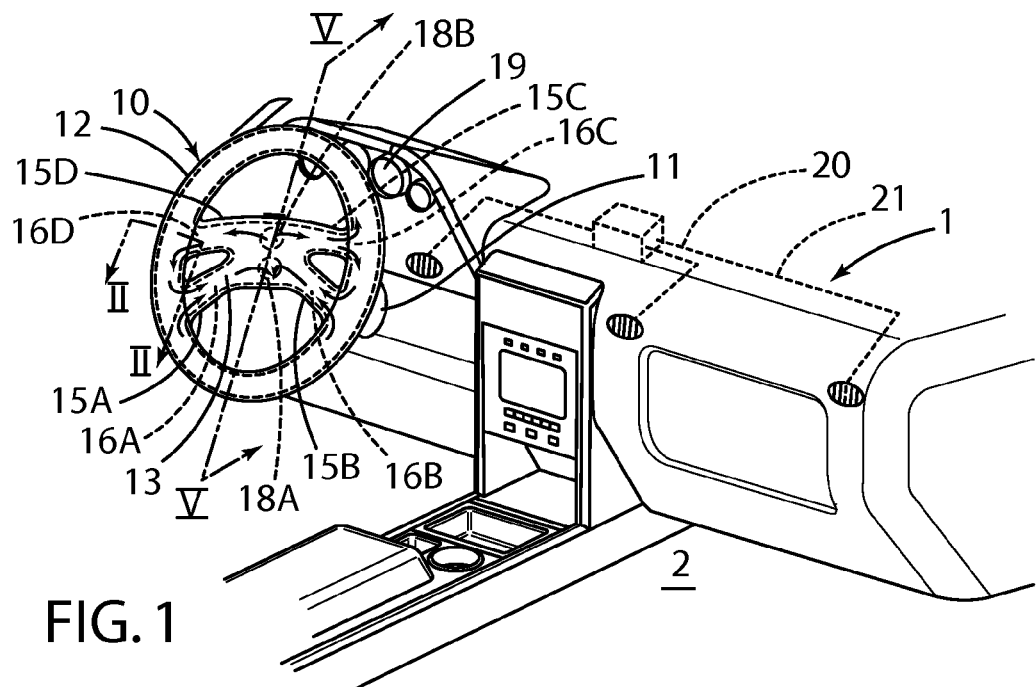
FIG. 1 is a partially fragmentary isometric view of a portion of a vehicle interior including a heated/cooled thermoelectric steering wheel according to one aspect of the present invention.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

With reference to FIG. 1, a motor vehicle 1 includes an interior space 2 including a steering wheel assembly 10 according to one aspect of the present invention. The steering wheel assembly includes a steering column 11, a circular rim 12, and a central portion or hub 13 that is connected to the steering column 11.

Figure 2:
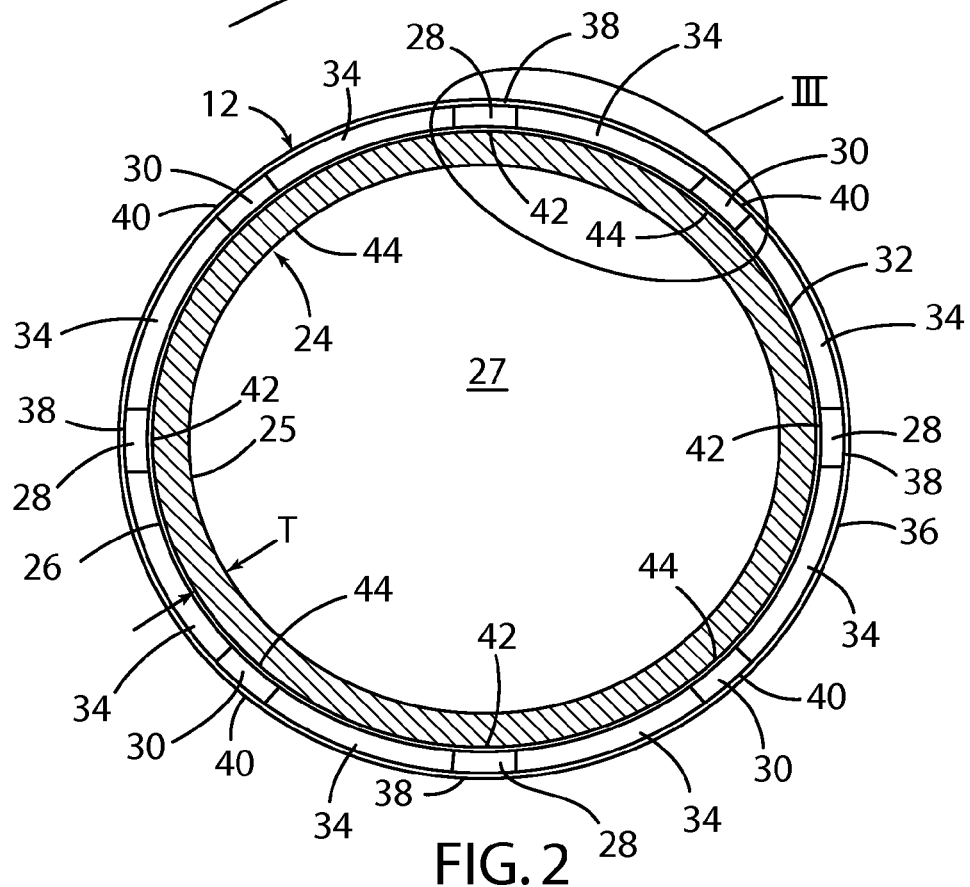
FIG. 2 is a cross-sectional view of the steering wheel of FIG. 1.

As shown in FIG. 2, rim 12 generally comprises a tube 24 having a cylindrical inner surface 25, a cylindrical outer surface 26, and an internal passageway 27. The outer surface 26 is generally in the shape of a toroid. The tube 24 may have a generally uniform wall thickness "T." The tube 24 may be formed from a metal such as steel, or other materials having the required structural characteristics, and heat transfer capability. A plurality of N-type thermoelectric elements 28, and a plurality of P-type thermoelectric elements 30 may be mounted on a conductive inner layer 32 disposed on outer surface 26 of tube 24. Thermally insulating material 34 is disposed between adjacent TE elements 28 and 30 to thermally isolate adjacent P and N-type TE elements. An outer conductive layer 36 is disposed on, and interconnected with, outer surfaces 38 and 40 of N-type TE elements and P-type TE elements 28 and 30, respectively. Inner surfaces 42 of N-type TE elements 28 and inner surfaces 44 of P-type TE elements 30 may be electrically connected to inner conductive layer 32.

The N-type and P-type TE elements 28 and 30, respectively, may comprise Peltier elements wherein the N and P-type thermoelectric materials are stacked electrically in series, and thermally in parallel. The basic construction of Peltier elements is known, and the details of the materials and methods utilized to fabricate the N and P-type elements 28 and 30 will not therefore be described herein. In a preferred embodiment, the TE elements 28 and 30 comprise thin plate-like members having a quadrilateral or square perimeter and generally parallel, flat opposite side surfaces 38, 40, 42, and 44. The thickness divided by the cross-sectional area is generally in the range of 0.125, but it may be in the range of about 0.08 to about 0.20. It will be understood that the TE elements could have circular perimeters, oval perimeters, or other suitable shape. In a preferred embodiment, the TE elements 28 and 30 are about 2 mm×3 mm×0.5 mm thick. Although the inner surfaces 42 and 44 of the TE elements 28 and 30, respectively, are planar, the curvature of outer surface 26 of tube 24 is sufficiently large relative to the size of the TE elements 28 and 30 so as to permit the use of solder to bridge both electrically and physically between the TE elements 28 and 30 and the tube 24.

Figure 3:
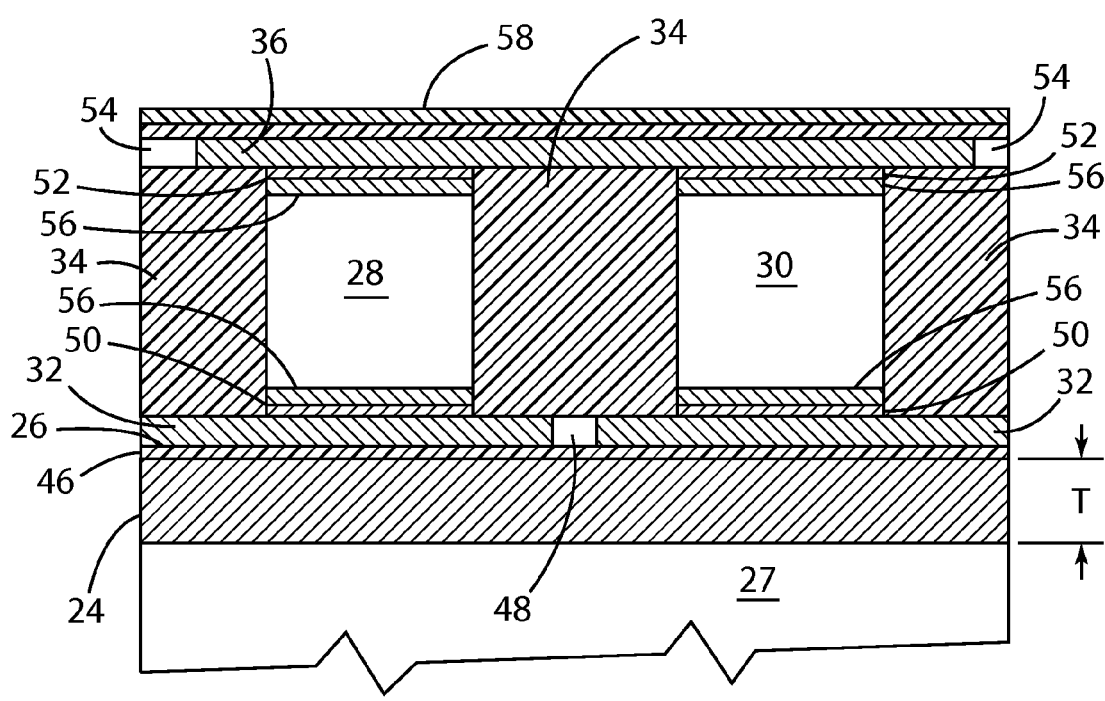
FIG. 3 is an enlarged cross-sectional view of the steering wheel of FIG. 2.

With further reference to FIG. 3, an electrical insulating layer/thermoadhesive 46 is disposed on outer surface 26 of tube 24. A layer 32 of flexible conductive material is disposed on layer 46, and gaps or electrically insulating material 48 are disposed between adjacent electrical conductors 32. Solder 50 and 52 is used to electrically secure the TE elements 28 and 30 to inner conductive layer 32, and to outer conductive layer 36. Gaps or insulating material 54 electrically isolate conductive layer 36 from adjacent conductive layers. Metalization and defusion layers 56 are disposed between the solder and the TE elements 28 and 30. The electrically conductive layers 32 and 36 interconnect alternating N and P-type TE elements in series. However, the N and P-type TE elements are thermally connected in parallel due to the thermal conductivity of the materials other than thermally insulating material 34. This provides for heat transfer directly between outer wheel cover or skin 58 and tube 24. It will be understood that the TE elements 28 and 30 and other components are shown schematically in FIG. 3 with increased thickness and reduced spacing for purposes of illustrating the arrangement of the various layers of material.

Figure 4:
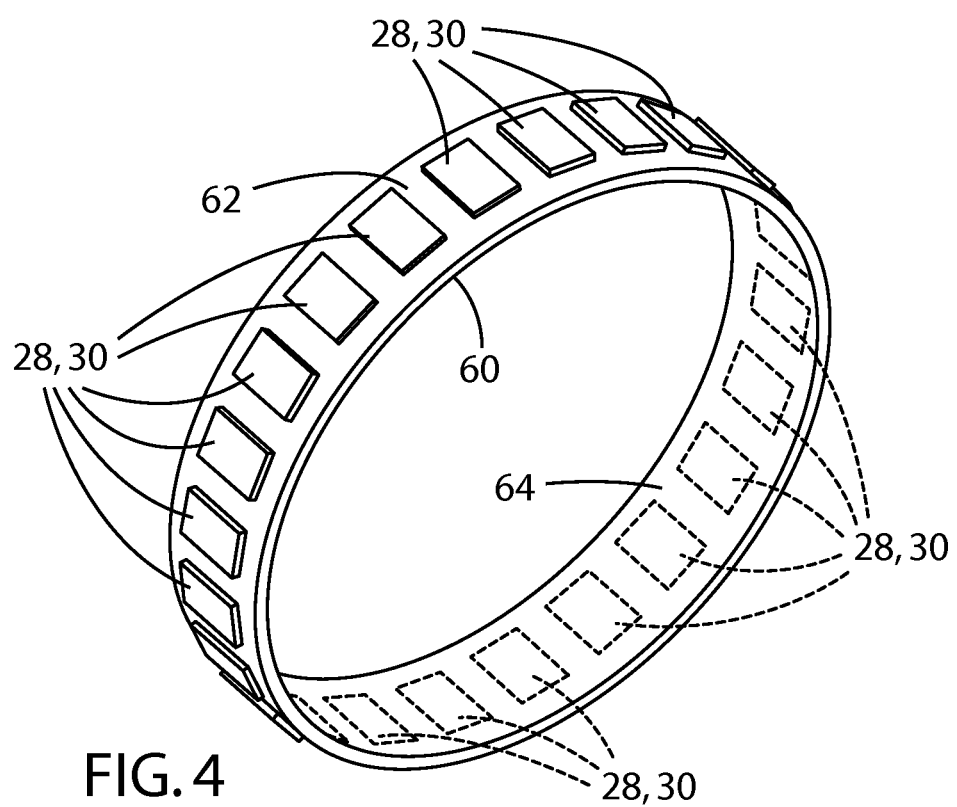
FIG. 4 is an isometric view of a ring including a plurality of thermoelectric elements.

With further reference to FIG. 4, TE elements 28 and 30 may be mounted to a ring 60 having an outer surface 62, and an inner surface 64. The TE elements 28 and 30 are electrically interconnected/insulated in substantially the same manner as described in more detail above. The TE elements 28 and 30 on ring 60A may all comprise N-type TE elements 28, and an adjacent ring 60B having all P-type TE elements 30 may be positioned adjacent the ring 60A.

The total resistance of the network of TE elements 28 and 30 preferably has a resistance in the range of about 0.5 to 2.0 ohms. Thus, the rings 60 and TE elements 28 and 30 are attached in a parallel-series configuration. This is accomplished by using a "cut" (not shown) in each ring 60 with a dielectric separator (e.g. a piece of polymer material). Each ring 60 has at least one positive locator pin (not shown) to provide correct orientation of the ring and to enable electrical conduction from one ring 60 to one or more adjacent rings 60. Each ring 60 is electrically isolated from tube 24 by a thermally conductive layer such as an electrodeposited metal oxide, a thin organic varnish, a powder coated paint, or other suitable material.

Figure 5:
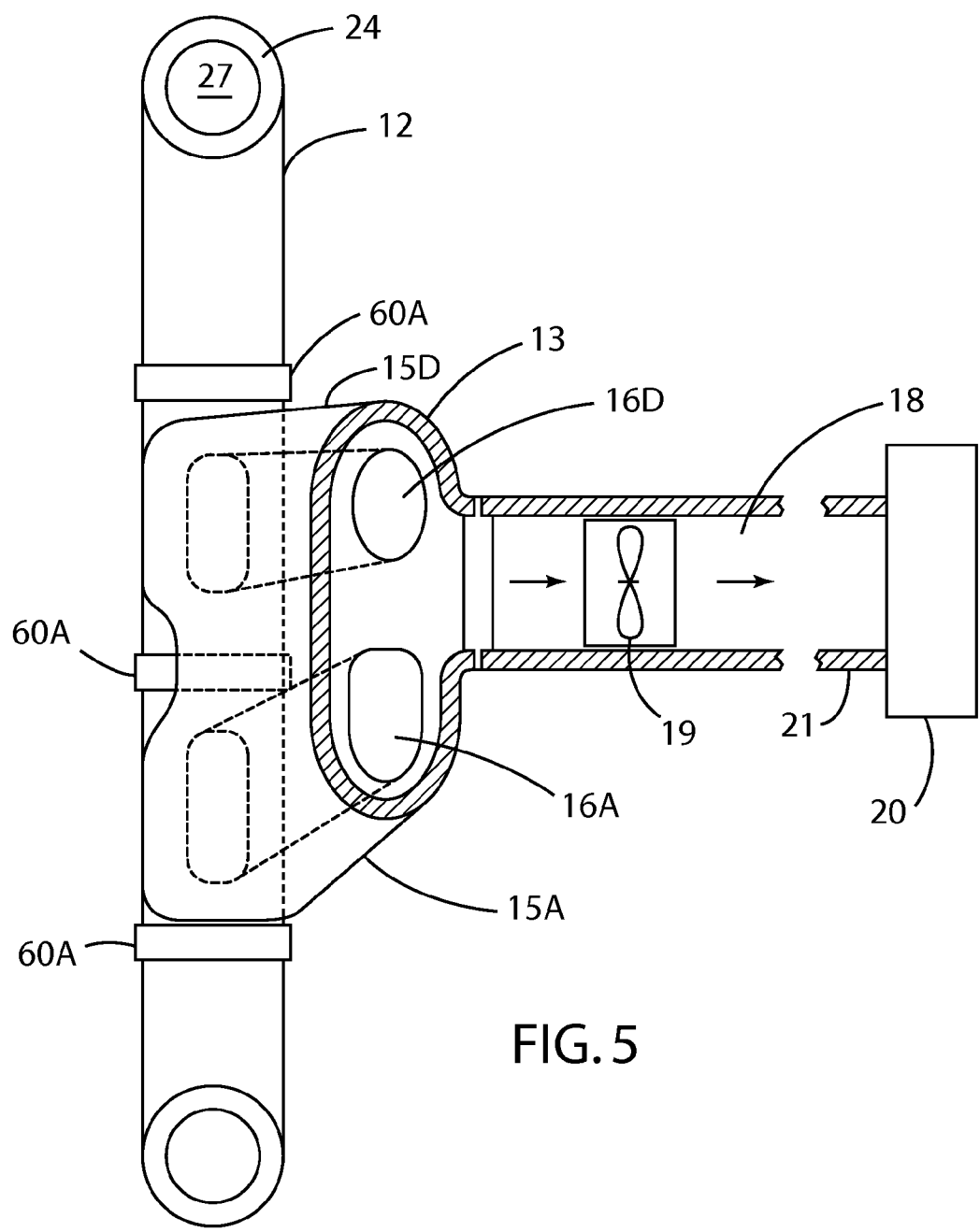
FIG. 5 is a partially schematic, fragmentary cross-sectional view of a steering wheel taken along the line V-V of FIG. 1.
Figure 6:
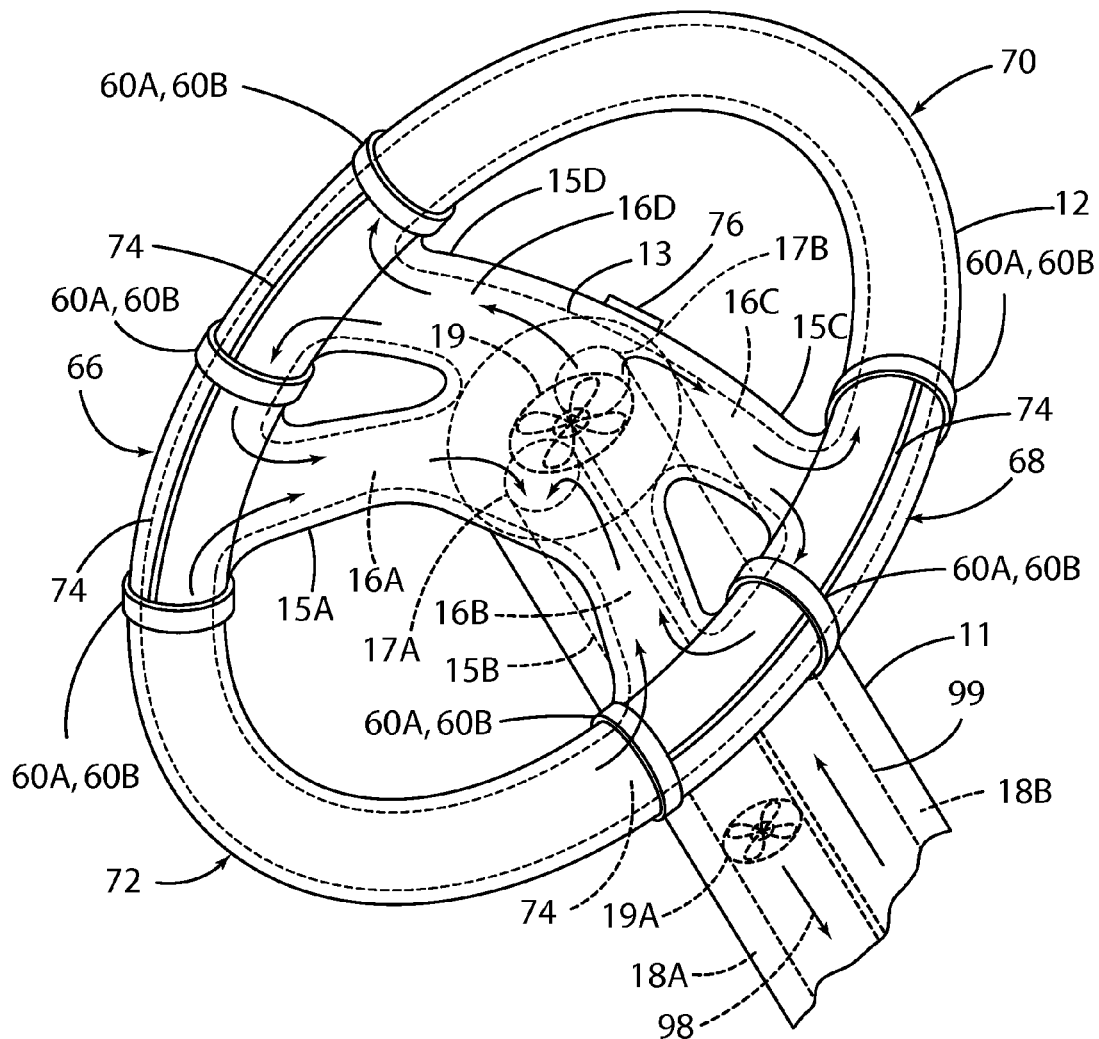
FIG. 6 is a partially fragmentary, enlarged view of the steering wheel of FIG. 1.

With further reference to FIGS. 5 and 6, rings 60A and 60B may be positioned adjacent the 3 o'clock and 9 o'clock positions 66 and 68, respectively of rim 12, and the 12 o'clock position 70 and 6 o'clock position 72 may be configured without rings 60A or 60b. In this way, the heating and cooling effects of the rings 60A and 60B can be directed to the 9 o'clock and 12 o'clock regions of the steering wheel rim 12 to provide heating or cooling in the areas of the rim 12 where a user's hand is most likely to be placed. Although the rings 60A and 60B could be positioned around the entire rim 12, positioning of the rings 60A and 60B only at the 3 o'clock and 9 o'clock regions reduces the total cost and complexity of the steering wheel assembly 10. A plurality of conductors 74 may extend between adjacent rings 60A and 60B to electrically interconnect the rings 60A and 60B. A temperature sensor 76 may be positioned on the central portion or hub 13 of the steering wheel 10. As discussed below in more detail in connection with FIG. 7, the temperature sensor 76 and rings 60A and 60B are electrically connected to a controller and to the vehicle power supply.

The steering wheel assembly 10 also includes one or more spokes 15A-15D that extend from the central portion 13 to the rim 12 (see also FIG. 6). The spokes 15A-15D include passageways 16A-16D extending between rim 12 and central portion or hub 13 of the steering wheel assembly 10. A fan 19 may be positioned in central portion/hub 13 to provide air draw up through parts 17A and 17B on an underneath side of central portion/hub 13. Alternately, the passageways 16A-16D may be fluidly connected to passageways 18A and 18B extending through steering column 11. A fan 19A may be utilized to circulate the air through passageways 16A-16D and passageways 18A and 18B. Passageways 18A and B may vent directly into the interior space 2 of the vehicle, or the passageways 18A or 18B may be fluidly connected to passageways 20 of the vehicle heating and air conditioning system 21.

Figure 7:
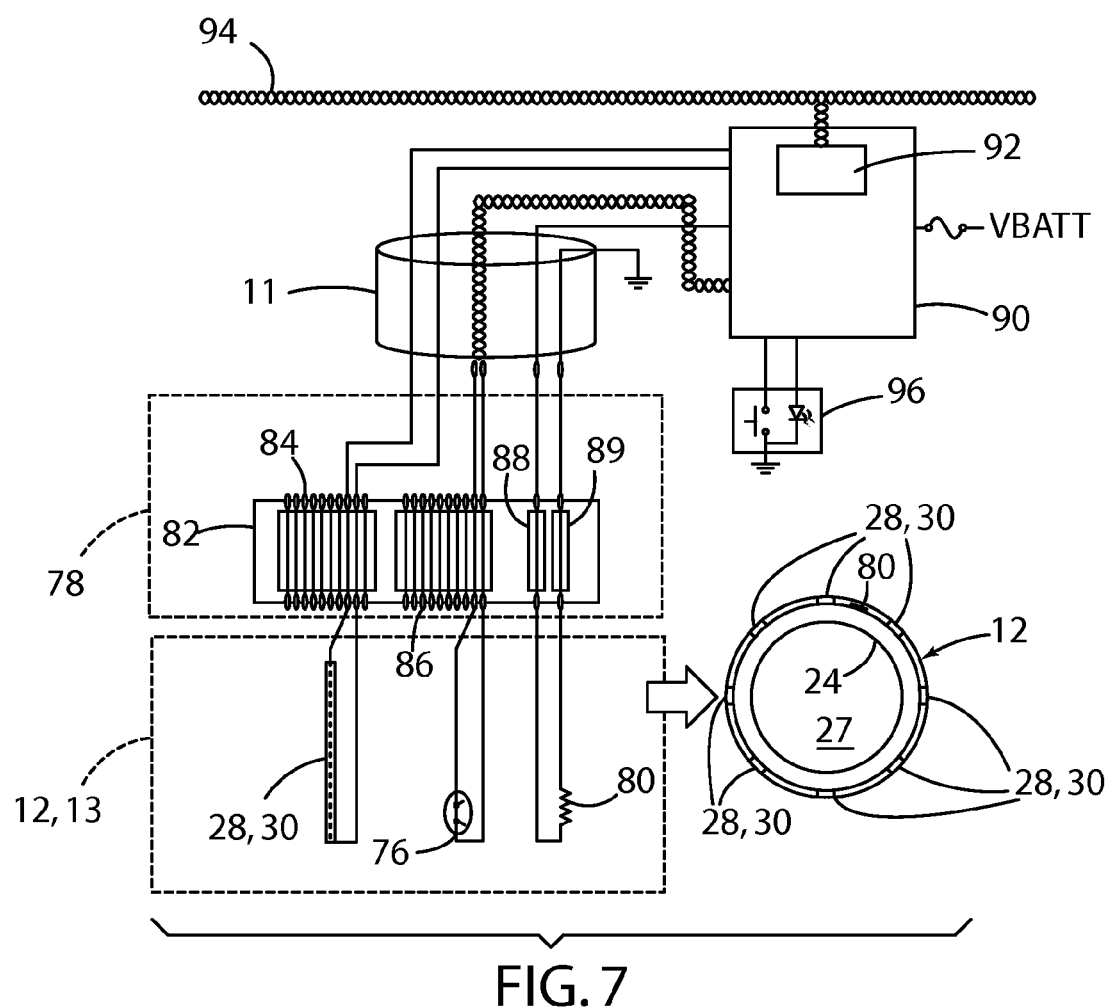
FIG. 7 is a schematic view of the electrical components of a steering wheel according to the present invention.

With further reference to FIG. 7, the steering wheel rim and hub 13 include the N and P-type TE elements 28 and 30. The temperature sensor 76 illustrated in FIG. 7 comprises a thermister 76. Also, a conventional electrical heater element 80 may also be disposed on rim 12 to provide heating of the rim 12. A clock spring 82 in a steering column module 78 includes a first 10-way ribbon 84, a second 10-way ribbon 86, and 1-way ribbons 88 and 89 that operably interconnect the TE elements 28 and 30, thermister 76, and heater element 80 to a steering wheel climate control module 90 through steering column 11. The steering wheel climate control module 90 includes a mid-speed controller area network ("MS-CAN") unit 92 that is connected to the MS-CAN bus 94 of a vehicle.

In use, the controller 90 determines if the steering wheel rim needs to be heated or cooled. If the steering wheel rim 12 needs to be heated, the controller 90 supplies electrical power to resistance heater 80. If, however, the rim 12 needs to be cooled, the controller 90 supplies electrical power to the TE elements 28 and 30, causing heat to transfer from the outer surface of the steering wheel to the inner surface 25 of tube 24. Circulation of air through the internal passageway 26 of rim 12 due to fan 19 thereby transfers the heat out of the rim 12 and into the passageways 18A and 18B in steering column 11. Incoming air 99 is drawn into passageway 18B in column 11, and heated air 98 exits through internal passageway 18A. As discussed above, the passageways 18A and 18B may open into the vehicle interior space 2, or the passageways 18A and 18B may be connected to one or more passageways 20 of a vehicle heating and air conditioning system 20.

Controller 90 may be operably connected to a wireless communication device such as a cell phone (not shown) to provide for remote actuation/control of the system. Controller 90 may also be operably connected to a remote start fob or to a conventional remote keyless entry or remote start fob to provide for actuation/control of the system prior to vehicle entry by a user. Also, controller 90 may be operably connected to a "door open" switch whereby the system is actuated upon opening of the vehicle door. Still further, the system may be configured to periodically monitor the vehicle cabin temperature and sun load (applied heat) utilizing sensors. Cooling (or heating) of the steering wheel may be controlled based on predefined criteria based or measured temperature or other parameters.

It is to be understood that variations and modifications can be made on the aforementioned structure without departing from the concepts of the present invention, and further it is to be understood that such concepts are intended to be covered by the following claims unless these claims by their language expressly state otherwise.

We claim:

1. A steering wheel assembly, comprising:
  a central portion configured to be connected to a steering column of a motor vehicle for rotation about an axis;
  a rim extending around the central portion, wherein the steering wheel includes a passageway extending through at least a portion of the rim, the rim defining an outer side portion facing away from the axis;
  a plurality of spaced apart rings of thermally conductive material disposed on the rim;
  a plurality of N-type thermoelectric elements having inner and outer surfaces, wherein the N-type elements are disposed on at least one of the rings with the inner surface facing the rim;
  a plurality of P-type thermoelectric elements having inner and outer surfaces, wherein the P-type elements are disposed on at least one of the rings with the inner surface facing the rim;
  a first thermal conductor thermally connected to the inner surfaces of the N-type and P-type elements and to the thermally conductive material of the at least one ring;
  a second thermal conductor thermally connected to the outer surfaces of the N-type and P-type elements;
  an electrical conductor interconnecting the P-type and N-type elements in series, such that an electrical current passing through the electrical conductor causes the N-type and P-type thermoelectric elements to conductively draw heat from the second thermal conductor to cool the second thermal conductor and conduct the heat to the rim;
  a powered air circulation device that moves air through the passageway to thereby cool the rim upon application of electrical power to the P-type and N-type elements.

2. The steering wheel assembly of claim 1, wherein:
  the steering wheel includes at least one spoke extending between the central portion of the steering wheel and the rim portion of the steering wheel, and wherein the passageway extends through the spoke and fluidly interconnects the rim and the central portion of the steering wheel.

3. The steering wheel assembly of claim 1, wherein:
  the rings comprise electrically conductive material; and wherein the N-type and P-type thermoelectric elements are electrically connected to the rings upon which each thermoelectric element is disposed.

4. The steering wheel assembly of claim 3, wherein:
  the thermoelectric elements comprise thin plate-like structures defining a perimeter, a thickness, and a cross-sectional area, and wherein a ratio of the thickness divided by the cross-sectional area is in the range of about 0.08 to about 0.20.

5. The steering wheel assembly of claim 3, including:
  a layer of electrically insulating, yet thermally conductive material disposed between the rings and the rim.

6. The steering wheel assembly of claim 1, wherein:
  the electrical conductors comprise a first electrical conductor disposed on the inner surfaces of the P-type and N-type thermoelectric elements, and a second electrical conductor disposed on the outer surfaces of the P-type and N-type thermoelectric elements, and including;
  a thermally insulating material disposed between adjacent P-type and N-type thermoelectric elements.

7. The steering wheel assembly of claim 1, wherein:
  each ring comprises a circular band of electrically conductive metal having opposite side edges and cylindrical inner and outer surfaces.

8. The steering wheel assembly of claim 1, wherein:
  each ring comprises a circular band of electrically conductive metal having opposite side edges and cylindrical inner and outer surfaces.

9. The steering wheel assembly of claim 8, wherein:
  each ring defines a generally constant width between the opposite side edges, and wherein:
  the P-type and N-type thermoelectric elements define a thickness and opposite side edges, and wherein a distance between the opposite side edges of the P-type and N-type thermoelectric elements is significantly less than the width of the rings.

10. The steering wheel assembly of claim 1, wherein:
  the powered air circulation device comprises a fan disposed in the steering wheel.

11. The steering wheel assembly of claim 1, including;
  a controller; and
  a temperature sensor operably connected to the controller wherein the controller controls an amount of electrical power supplied to the N-type and P-type thermoelectric elements based, at least in part, on a temperature sensed by the temperature sensor.

12. The steering wheel assembly of claim 11, wherein:
  the temperature sensor is positioned on the steering wheel.

13. The steering wheel assembly of claim 11, including:
  an electrical resistance heating element disposed on the rim of the steering wheel, wherein the electrical resistance heating element is controlled by the controller based, at least in part, on a temperature sensed by the temperature sensor.

14. The steering wheel assembly of claim 1, wherein:
  the rim of the steering wheel is generally circular and defines 12 equally spaced clock positions corresponding to positions on a clock face, and wherein:
  the rings of electrically conductive material provide a heat output level per unit length that is greater near the 3 o'clock and 9 o'clock positions than at the 12 o'clock position.

15. A method of controlling a temperature of a steering wheel of a motor vehicle of the type having an interior space that can be accessed by opening a door of the vehicle, the method comprising:

providing a steering wheel having a rim and a temperature control system including a plurality of N-type thermoelectric elements and a plurality of P-type thermoelectric elements on the rim that are electrically and thermally interconnected to conductively cool the rim of the steering wheel;

controlling an amount of electrical power supplied to the N and P-type thermoelectric elements utilizing at least one of a temperature of the interior space, heat input into the interior space from solar rays, a temperature of a component that is thermally connected to the interior space, and a signal from a remote device.

16. The method of claim 15, including:

providing a temperature sensor to measure a temperature of the steering wheel; and wherein:

an amount of electrical power supplied to the N and P-type thermoelectric elements is controlled utilizing a temperature of the steering wheel.

17. The method of claim 15, including:

providing a cell phone;

utilizing a signal from the cell phone to control the temperature control system of the steering wheel.

18. The method of claim 15, including:

measuring a temperature of a vehicle interior space at predefined time intervals when the vehicle is not in operation;

controlling the temperature control system based on the measured temperatures of a vehicle interior space.

19. A steering wheel, comprising:

a rim having an air passageway;

a metal ring extending around the rim;

thermally conductive, electrically insulating material between the rim and metal ring;

alternating P and N thermoelectric cooling elements on an outside of the metal ring;

metal material on an outside of the thermoelectric elements;

thermal insulation between the metal ring and the second metal material surrounding the thermoelectric elements;

electrical insulation on the second metal material.

20. The steering wheel of claim 19, wherein:

the rim is circular and defines 3 o'clock and 9 o'clock positions, and wherein a plurality of metal rings are disposed at the 3 o'clock position, and a plurality of metal rings are disposed at the 9 o'clock position;

adjacent pairs of P and N thermoelectric elements of each metal ring are electrically connected by the second metal material.

21. The steering wheel of claim 19, including:

a powered fan that moves air through the air passageway of the rim.

22. The steering wheel of claim 21, wherein:

the steering wheel includes a hub having an air passageway, the steering wheel further including a plurality of spokes extending between the hub and the rim and connecting the air passageways of the hub and rim to permit air to flow from the air passageway in the rim to the air passageway in the hub.

23. The steering wheel of claim 19, wherein:

the P and N thermoelectric elements provide a level of cooling per unit length of the rim that is greater at 3 and 9 o'clock positions of the rim than at a 12 o'clock position of the rim.

24. The steering wheel of claim 19, including:

a temperature sensor that generates temperature data;

a controller operably connected to the temperature sensor and controlling an amount of electrical power supplied to the P and N elements based, at least in part, on the temperature data.

* * * * *